United States Patent [19]

Whitehouse et al.

[11] 3,885,318

[45] May 27, 1975

[54] SURFACE PROFILE TESTING INSTRUMENT

[75] Inventors: David John Whitehouse; Melton Mowbray; Robert Claude Spragg, Leicester, all of England

[73] Assignee: The Rank Organisation Limited, London, England

[22] Filed: July 12, 1973

[21] Appl. No.: 378,667

[30] Foreign Application Priority Data

Aug. 17, 1972 United Kingdom............... 38415/72

[52] U.S. Cl.............................. 33/174 L; 33/174 P
[51] Int. Cl........................... G01b 5/20; G01b 7/28
[58] Field of Search............ 33/174 R, 174 L, 174 P, 33/174 Q, 1 BB, 27 R, 27 L; 29/156.4 WL; 418/61 A

[56] References Cited
UNITED STATES PATENTS 2,422,034  6/1947  Mustonen .......................... 33/174 R
3,808,944  5/1974  Braginetz ........................... 33/27 R

FOREIGN PATENTS OR APPLICATIONS 25,923  10/1969  Japan ............................... 33/174 R Primary Examiner—Richard E. Aegerter
Assistant Examiner—Richard R. Stearns
Attorney, Agent, or Firm—Brisebois & Kruger

[57] ABSTRACT

An instrument for testing the profile of a surface of an object having a non-circular, e.g. trochoidal, nominal shape, in which relative rotation is effected betweeen the object under test and the transducer, this relative rotation being compounded of two independent simultaneous rotations about parallel spaced apart axes so arranged that the transducer feeler traces a path which conforms to the nominal shape so that the transducer detects departures from the nominal shape. Automatic correction may be made for changes in the angle of the transducer feeler relative to the surface as the surface is scanned by the feeler.

9 Claims, 5 Drawing Figures

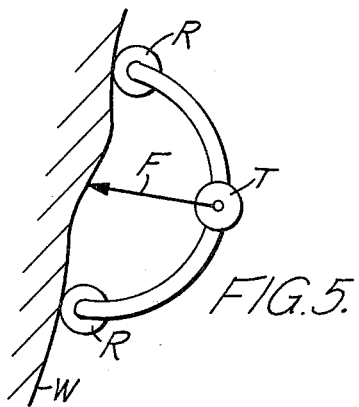
FIG. 5.
FIG. 3.
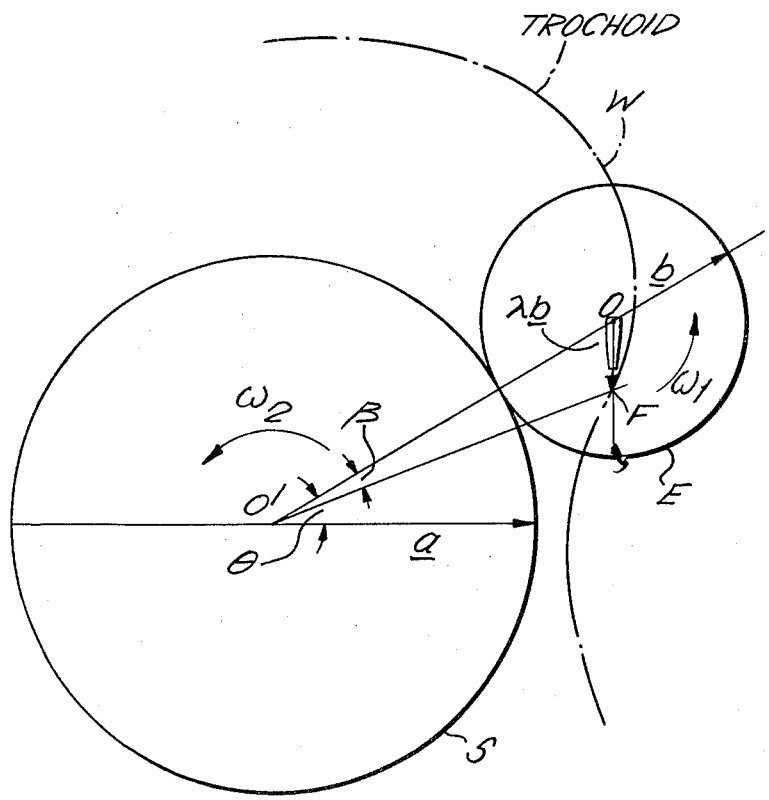

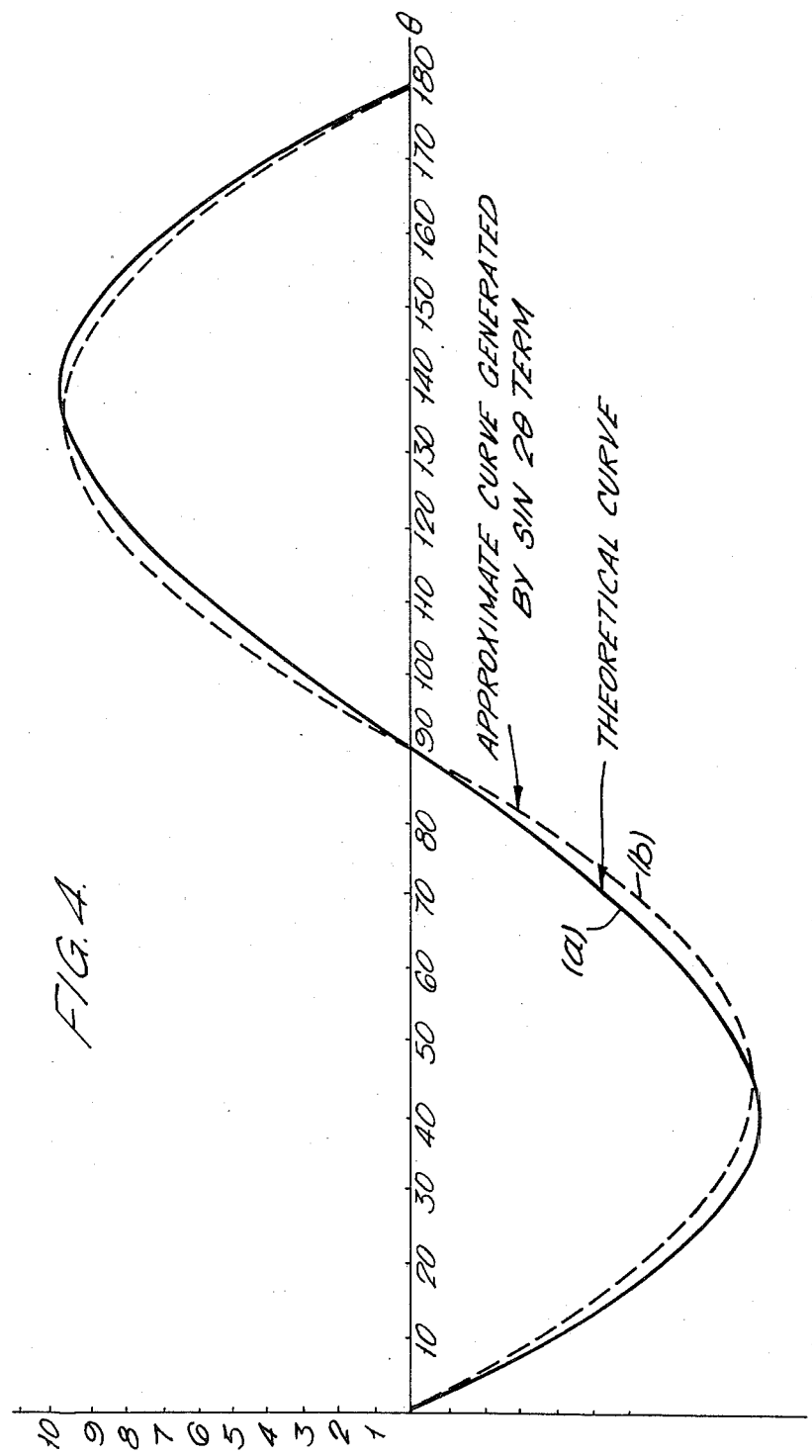

SURFACE PROFILE TESTING INSTRUMENT

This invention relates to an instrument for testing surface profiles, more particularly the profiles of objects having ostensibly trochoidal surfaces.

In measuring the surface profiles of objects or work pieces the need occasionally arises for measuring surfaces the nominal shape of which is non-circular, for example elliptical, trochoidal or other lobed surface shapes. For such purposes, the usual type of "out of roundness" measuring machine is unsuitable, since the surface feeler of such a machine will in general be subjected to greater displacements than its dynamic range if it is made to scan a lobed surface.

The method employed hitherto for testing lobed surface profiles is to use a comparative technique in which the surface under test is compared with a reference surface mounted on the same axis of rotation. An object of the present invention is to provide an instrument for measuring directly the profile of a lobed surface, using a surface transducer.

Broadly defined, the present invention provides an instrument for testing the profile of a surface of an object having a nominal shape which is non-circular, said instrument comprising a surface transducer having a feeler adapted to engage the surface of the object, and means for effecting relative rotation between the object under test and the transducer, said relative rotation being compounded of two independent simultaneous rotations about parallel spaced apart axes such that the transducer is responsive to departures of the said surface from the said nominal shape.

In one embodiment of the invention the instrument includes mounting means for the object under test, rotatable about a first axis, said mounting means being itself carried by support means which is rotatable about a second axis spaced from and parallel to the first, the transducer being located at a fixed position relative to said second axis.

Alternatively, the mounting means for the object under test may be rotatable about a first axis, and a rotatable support means for the transducer may be rotatable independently of the mounting means about a second axis spaced from and parallel to the said first axis.

In another alternative embodiment of the invention, the instrument includes mounting means for the transducer, rotatable about a first axis, said mounting means being itself carried by support means which is rotatable about a second axis spaced from and parallel to the first axis, and including a support for the object under test which is fixed relative to said second axis.

The instrument according to the invention is particularly suitable for testing surfaces having a nominally trochoidal shape, for example the epitrochoid shape of the stator in a Wankel engine. The instrument is readily adaptable to this purpose by arranging that the rotational speed of the mounting means about the first axis is an integral multiple of the rotational speed of the support means about the second axis. For measuring a two-lobed epitrochoidal shape of the kind used in a Wankel engine the rotational speed of the mounting means about the first axis would be twice the rotational speed of the support means about the second axis.

For measuring surfaces having a nominally hypotrochoidal shape the two independent rotations of the instrument are in the same sense, while for measurements of surfaces having a nominally epitrochoidal shape the two independent rotations are in opposite senses.

Advantageously, the instrument is adaptable to measurement of different shapes having different geometrical parameters, and for this purpose the distance between the two axes of rotation is preferably adjustable. In addition, in the instrument in which the surface feeler of the transducer is non-rotatable with respect to the second axis, the distance between said surface feeler and the second axis is adjustable, for example by cartesian or by polar co-ordinate adjustment means.

Preferably the position of the first axis of rotation is adjustable with respect to a fixed frame of reference by cartesian or by polar adjustment means.

Where the object under test is carried on mounting means the latter are preferably adjustable to permit the centre of the object to be aligned concentrically with the said first axis. Alternatively, where the object under test is carried on a fixed support, the said support preferably includes means for adjusting the position of the centre of the object into alignment concentrically with the said second axis.

In use of the instrument, the transducer moves relatively to the surface under test and provides signals in response to and proportional to displacements of its surface feeler, the instrument being so arranged that the said feeler displacements indicate departures of the surface under test from a predetermined nominal shape. In practice, most transducers are such that the movable surface feeler has maximum sensitivity in one direction of relative movement when in contact with a surface, this direction usually being a direction perpedicular to the surface at its point of contact with the feeler. Since the surface under test is non-circular, the direction of movement of the feeler will in general be inclined to the direction of maximum sensitivity, and in the absence of steps to compensate for this the transducer output would give an erroneous indication of the surface variations. Accordingly the transducer is preferably connected to compensating means which modify the output of the transducer to compensate for changes in said output due to changes in the angle between the direction of maximum sensitivity of the transducer feeler and the surface of the object under test at its point of contact with the stylus.

Alternatively, the transducer feeler may be provided with a swivel mounting which permits rocking movement of the feeler, the transducer including rollers or skids which engage the surface of the object under test on each side of the feeler so as to maintain the feeler with its direction of maximum sensitivity perpendicular to the surface of the object at the point of contact of the feeler with said surface.

Some practical embodiments of the present invention are illustrated, merely by way of example, with reference to the accompanying purely diagrammatic drawings, in which:

FIG. 3 illustrates diagrammatically part of a nominally epitrochoidal workpiece and a surface transducer as used in an instrument according to the invention;

FIG. 4 illustrates graphically the correction of the recorded surface variations or a polar recorder in a preferred embodiment of the invention, and FIG. 5 is a diagrammatic elevational view showing one form of transducer for use with the instrument according to the invention.

Throughout the drawings, the same reference numerals are used to indicate corresponding or equivalent parts.

Figure 1:
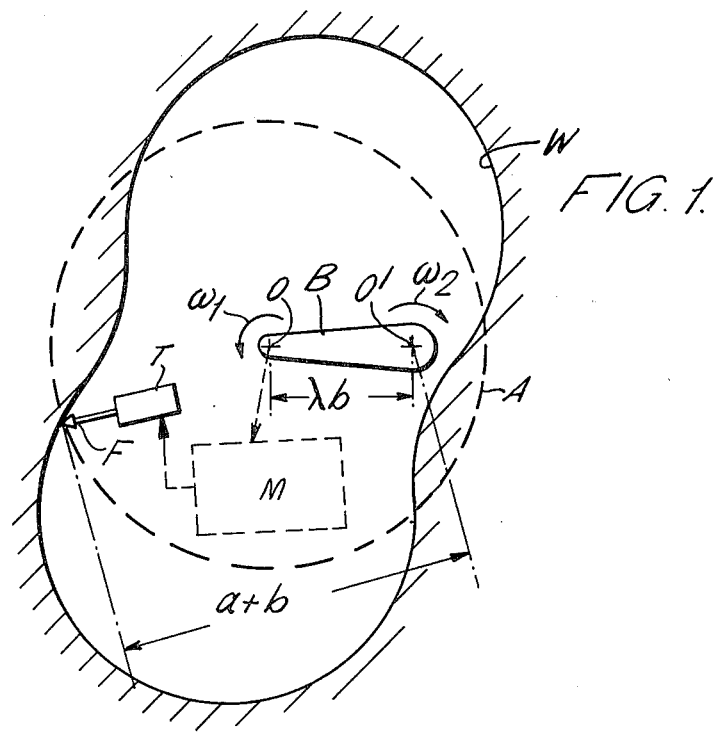
FIG. 1 shows schematically in plan the arrangement of an instrument according to the invention for measurement of the profile of a nominally epitrochoidal surface.

Referring first to FIG. 1, a work-piece or object W under test is shown diagrammatically as a stator of a Wankel engine having a two-lobed epitrochoidal combustion chamber the internal surface of which is shown by a solid outline in FIG. 1, the remainder of the work-piece W being omitted for the sake of clarity. The workpiece W is mounted upon mounting means in the form of a circular table A, the position of the work-piece W on the table A being adjustable by any convenient means (not shown) so that the nominal centre of the work-piece W is concentric with the centre O of the table A.

The work-piece table A is rotatable about a centre O at a rotational speed $\omega_1$, indicated by an arrow, and the table itself is carried by rotating support means indicated diagrammatically by an arm B, rotatable about a fixed centre O' at a rotational speed $\omega_2$, in the opposite direction to the rotation of the table A about the centre O, as indicated by the arrows. In practice the element B may comprise a second rotary table.

The rotational centres O and O' define the first and second axes of rotation referred to previously.

A transducer T is located at a fixed position relative to the second axis O' and has a surface feeler F which engages the surface of the work piece W under test.

It can be shown that, by suitably selecting the rotational speeds $\omega_1$, $\omega_2$, the directions of rotation, the distance between the first and second axes O, O', and the distance FO' it is possible to measure a variety of shapes. That is to say, with a suitable selection of these parameters the feeler F of the transducer T will undergo no displacement during a complete cycle of rotation of the work-piece W if the surface under test conforms to a given nominal shape, so that the output of the transducer, dependent upon the feeler displacement, will be indicative solely of departures of the actual surface under test from this nominal surface shape.

Figure 2:
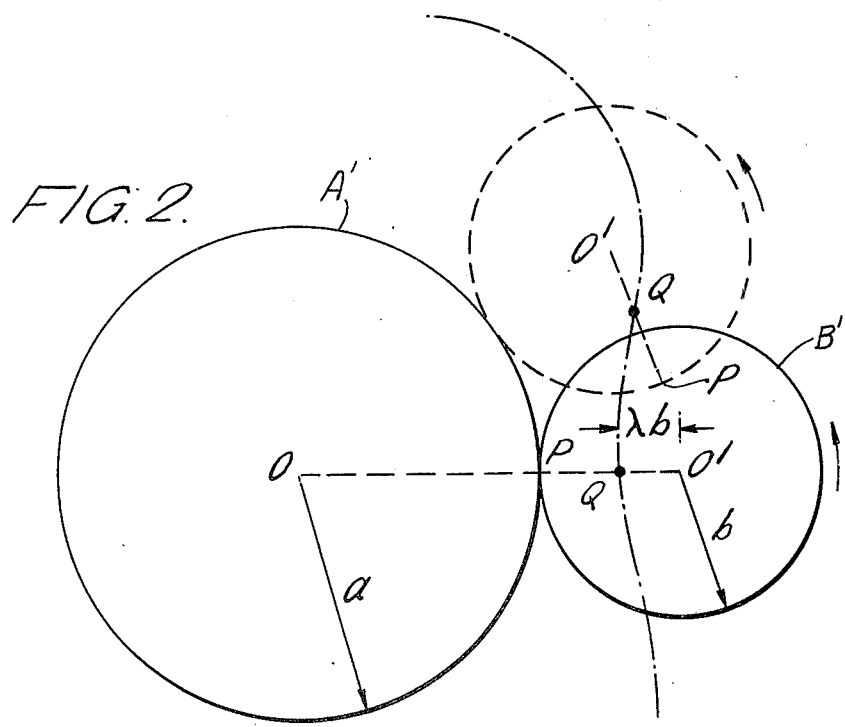
FIG. 2 illustrates diagrammatically the geometrical construction of an epitrochoid similar to the shape of the surface under test in the instrument of FIG. 1.

In the particular example illustrated in the drawings, where the workpiece W has a two-lobed epitrochoid shape, the selection of the appropriate parameters for the instrument can be derived from a consideration of the geometry of the epitrochoid, illustrated diagrammatically in FIG. 2.

An epitrochoid is the locus of a point Q located on a radius O'P of a circle B' as it rolls without sliding over the surface of another circle A' having a radius $a$ which is an integral multiple of the radius $b$ of the circle B'. For the particular case of a two-lobed epitrochoid such as that of the illustrated work-piece W the radius $a$ is equal to twice the radius $b$, that is $a/b = 2$.

If the circle B' were to roll on the inside of the circle A' the resulting locus traced by the point Q would be a hypotrochoid.

The degree of the trochoid may be expressed by a ratio given by: $\lambda = O'Q/b$, as illustrated in FIG. 2. In the extreme case where $\lambda = O$ the point Q coincides with the centre O' and the resulting locus is a circle.

In the instrument shown in FIG. 1 the distance between the normal or rest position of the transducer feeler F and the fixed second axis O' is arranged to be equal to $(a + b)$ and the distance between the first and second axes O,O' is arranged to be equal to $\lambda b$, as indicated in FIG. 1. Where the surface under test is a two-lobed epitrochoid, as in this example, $a = 2b$ and $\omega_2 = 2\omega_1$. With such an arrangement, it can be shown that, provided the surface under test of the work-piece W is accurately centred with respect to the first axis O and is mounted in the correct phase relationship with respect to the line O'T then the output of the transducer T will represent only departures of the work-piece shape from the nominal trochoidal shape.

When setting up the instrument for measurement of a given trochoidal shape the distance $(a + b)$ and the ratio $\lambda$ are derived from the epitrochoid shape in question, $(a + b)$ being one-quarter of the sum of the maximum and minimum diameters of the epitrochoid and $\lambda b$ being equal to one-quarter of the difference between the maximum and minimum diameter of the epitrochoid. Since the maximum and minimum diameter can be obtained from the drawing or from the part in question this enables the values of $(a + b)$ and $\lambda b$ to be derived and, therefore, enables the distances FO' and OO' to be set up on the instrument.

In practice the instrument is adapted so that the surface feeler F of the transducer T can be arranged to make contact with an internal surface of a work-piece, as in the illustrated embodiment, or an external surface.

The correct position of the work-piece or object under test W on the table A is, in the illustrated case of an epitrochoid, such that the long axis of the epitrochoid is, at the commencement of measurement, perpendicular to the line joining the point of contact F of the feeler with the surface and the fixed second axis O' with the first axis O lying on the line FO'. If the work-piece is centred on the table A but is not initially in this starting position, then the phase angle of the work-piece surface relative to the transducer can be corrected by adjustment of the vector represented by the line OO'. Such adjustment can be effected by cartesian co-ordinate adjustments on the rotary element B, allowing the position of the first axis O to be moved into the correct phase relationship. The $x$ and $y$ co-ordinates of such an adjustment have to be such that the correct phase is obtained without changing the modulus given by the square root of the sum of the squares of the two $x$ and $y$ adjustments, this modulus being the parameter $\lambda b$ of the trochoid in question.

Another method of 5 the phase of the surface under test is to provide for polar adjustment of the first axis O relative to the rotary element B. Adjustment of phase could alternatively be made independently of the degree $\lambda$ of the trochoid by means of a rotational facility on the centre adjusting of the table B.

In the embodiment of FIG. 1, various sizes of trochoid can be catered for by adjustment of the null position of the transducer feeler F relative to the fixed second axis O', and the shape of the nominal trochoid with reference to which testing is made can be changed by adjustment of the distance OO' between the first and second axes. Adjustment of the distance FO' can be utilised for centring the work-piece W on the table A using a cartesian or polar adjustment of the table A while the rotary element B is stationary, with the first axis O on the line TO'.

The embodiment shown in FIG. 1 can be used for measuring near elliptical shapes. In this case, the rotary work-piece mounting means (A) and the rotary support means (element B) are arranged for rotation in the same sense, the distance FO' being made equal to ($a - b$). If the ratio of the two rotational speeds $\omega_2:\omega_1$ is again 2:1 then the transducer will measure departures from a near elliptical shape. In this mode the instrument is suitable for measuring the cross sectional shapes of pistons or cylinders for internal combustion reciprocating engines. In this case, also, accurate centring of the work-piece W with respect to the axis O of the table A would be effected by suitable centring adjustment means on the table.

In general the surface profile as sensed by the transducer feeler F is conveniently recorded on a polar recorder, for example a chart recorder. If a chart recorder of the usual constant speed type is used, in which the chart is rotated relative to a recording pen at a constant speed, the trace obtained will correspond accurately with the surface under test, since the angular speed of rotation of the surface feeler F relative to the work-piece surface W under test is not constant, being compounded of two simultaneous angular rotations. Thus as illustrated diagrammatically in FIG. 3, if the surface feeler F rotates about an axis O at a rotational speed $\omega_1$, and the axis O is itself rotated about a fixed axis O', parallel to the axis O, at a rotational speed $\omega_2$ it is possible to cause the feeler F to trace a variety of shapes, and therefore measure departures from such shapes for a given workpiece surface W under test, as described previously. A polar recorder is used to record the surface variations sensed by the transducer feeler F. The polar recorder may, for example, have a chart which is rotated at a constant angular speed equal to the rotational speed $\omega_2$ of the instrument about the axis O', so that the polar angle recorded for a given reading will correspond to the polar angle $\theta$ of the arm OO' with respect to the fixed axis O'.

It will be apparent from FIG. 3, however, that the polar angle $\theta$ at any given time will not in general represent the true angular position of the feeler F, since the latter is simultaneously rotating on arm OF about the axis O: the feeler F is displaced angularly from the line OO', as measured from the axis O', by an angle $\beta$, so that the true polar angle of the feeler F is ($\theta - \beta$). Moreover, the angular displacement $\beta$ is not constant, but varies sinusoidally as a function of $\theta$, being zero at a number $2n$ of equiangularly spaced apart angular positions of the arm OO', where, as previously, $n$ is the number of lobes of the epitrochoid.

Consequently, the angular positions recorded on the polar recorder will not in general correspond to the angular positions of the feeler F, if a constant speed polar recorder is used. This discrepancy in the polar recording means may be taken into account and used to provide a corrected recording of the surface profile of an object under test.

Thus in a preferred embodiment of the invention for testing the profile of a surface of an object having a nominally trochoidal shape, the instrument includes recording means for recording the surface profile of the object in polar coordinates the polar angle of which at any given instant corresponds to the instantaneous polar angle $\theta$ of the rotation about one of the two axes of rotation, modified by an angular correction $\beta$ for the angular displacement between the surface feeler and the line joining said axes of rotation, said angular correction $\beta$ being a function of the angle $\theta$.

It has been found that a close approximation to the true polar angle of the feeler can be effected in practice by arranging that the angular correction is proportional to $\sin n\theta$, where $n$ is the number of lobes of the trochoidal shape. More particularly, a preferred angular correction for a two-lobed epitrochoidal shape is given by $\tan^{-1}(\lambda/9-\lambda^2) \cdot \sin 2\theta$, where $\lambda$ represents, as in FIG. 1, the degree of the trochoid.

The desired angular correction $\beta$ may be applied in a number of ways, a preferred method being to modulate the polar angle display of the recording means with the angular correction. In the case of a chart recorder such modulation could conveniently be effected by rotating the chart at a rotational speed having a constant component and a sinusoidal modulation component proportional to the angular correction.

The modulation of the polar angle of the recording means is preferably generated by an oscillator. Alternatively, the modulation may be generated by a synchronous detector responsive to the rotation relative to the said one axis. In a further alternative, the polar angle modulation may be generated by encoders responsive to the rotations about the two axes of rotation of the instrument.

The preferred form of angular correction $\beta$ may be derived from the geometry of the instrument, as illustrated diagrammatically in FIG. 3. Thus assuming that when $\theta = O$ the feeler F lies on the line OO', the angle O'OF in FIG. 1 will be $n\theta$, where $n$ is the number of lobes of the epitrochoidal shape ($\omega_1 = n\omega_2$).

From FIG. 1:

$$\tan \beta = \frac{b \lambda \sin n\theta}{a + b - \lambda b \cos n\theta}$$

or, since $a = b$, $$= \tan^{-1}\left[\frac{\lambda \sin n\theta}{1 + n - \lambda \cos n\theta}\right] \quad (1)$$

For the case of a two lobed epitrochoidal shape where $n = 2$, $$= \tan^{-1}\left[\frac{\lambda \sin 2\theta}{3 - \lambda \cos 2\theta}\right] \quad (2)$$

Apart from trivial solutions, $\beta$ will be a maximum when $d\beta/d\theta$ is zero. From equation (2):

$$\frac{d\beta}{d\theta} = \frac{6\lambda \cos 2\theta - 2\lambda^2}{9 - 6\lambda \cos 2\theta + \lambda^2} \quad (3)$$

From equation (3) it is deduced that $\beta$ is a maximum when $\cos 2\theta = \lambda/3$, that is:

$$\theta = \tfrac{1}{2} \cos^{-1} \lambda/3 \quad (4)$$

The maximum value of $\beta$ is, therefore, from equation (2) given by:

$$\tan \beta_{max} = \frac{\lambda}{\sqrt{9-\lambda^2}}$$

$$\text{that is } \beta_{max} = \tan^{-1}\left[\frac{\lambda}{\sqrt{9-\lambda^2}}\right] \quad (5)$$

Typical values of $\beta$ max are 19.6° for $\lambda = 1$, that is, for an epicyclic shape, and 9.6° for $\lambda$ 0.5, which is typical of the Wankel engine stator.

From equation (1) it is apparent that $\tan \beta$ is a function of $\sin 2\theta$.

For an opitrochoid with two lobes having a degree of 0.5, which is typical of a Wankel Engine stator, the actual values of the angular correction $\beta$ are small and never exceed 10°, so that $\tan \beta$ may be said to a close , to be directly proportional to $\sin 2\theta$, with an amplitude given by equation (5). Thus to a first approximation the angular correction is given by:

$$\beta \cong \tan^{-1}\left(\frac{\lambda}{\sqrt{9-\lambda^2}}\right) \cdot \sin 2\theta \quad (6).$$

The closeness of this approximation is illustrated in FIG. 4, which shows in curve (a) the true value of the angular correction $\beta$ as a function of $\theta$ as given by equation (2) and in curve (b) the approximation to $\beta$ given by equation (6), for a degree $\lambda$ of 0.5. It will be seen that the difference between the true and approximate values of $\beta$ is always less than 1°.

Compensation for the variation in position of the surface feeler F can also be achieved by varying the speed of revolution of the polar recorder — for example the speed of rotation of the chart in a chart recorder — by the simple $\sin 2\theta$ term expressed in equation (6). Such sinusoidal modulation can be effected by feeding a stepper motor driving the recorder with a direct current the magnitude of which is varied by a sinusoidal frequency modulation having a frequency which is twice that of the polar recorder. The depth of the frequency modulation should, of course, be sufficiently small to allow satisfactory operation of the motor.

In the embodiment of FIG. 1, in which the transducer T is fixed, the speed at which the surface of the workpiece passes the feeler F of the transducer T is not uniform, but is relatively high where the curvature of the surface at the feeler F is gradual and relatively low where the curvature is high, for example at cusps or protuberances on the surface. This variation in the relative velocity of the surface and the feeler F is advantageous as regards measurement, since the greatest accuracy is required at those parts of the surface which have high curvature.

In the embodiment of FIG. 1 the surface to be measured will in general be such that, at its point of contact with the transducer feeler F it will not usually be perpendicular to the direction of movement of the feeler, that is, the direction of maximum sensitivity thereof. For many surfaces, the variation in sensitivity as the angle between the feeler F and the surface under test changes need not be compensated: for example, in the first embodiment the effective variation in the sensitivity of a transducer in measuring a surface for which $\lambda = 0.5$ is typically about 1 or 2%. Compensation can, however, be effected electrically by connecting compensating means M, shown diagrammatically in FIG. 1, to the rotary element which rotates at the slower speed, to modify the output of the transducer at a rate proportional to the sine of the angle between the direction of movement, or direction of maximum sensitivity, of the feeler F and the normal to the surface at the point of contact of the feeler F.

An alternative method of avoiding variation in the sensitivity of the transducer in measuring non-circular surfaces is to mount the transducer, or the transducer feeler F, on a swivel mounting, as illustrated in FIG. 5, which includes two rollers or skids R carried by a yoke of the swivel mounting and arranged to make contact with the surface under test on each side of the point of contact of the feeler F, which is pivotable relative to the transducer T or to the yoke on which the transducer T is mounted so as to maintain the feeler with its direction of maximum sensitivity perpendicular to the surface at all times.

It will be appreciated that in all the embodiments of the invention herein described complete generality of the instrument for measuring different non-circular shapes is afforded by six degrees of freedom in the instrument, that is, six independent adjustments:

i. The ratio of $a$ to $b$;
ii. The magnitude of $a$, $b$ or $(a + b)$ or $(a - b)$;
iii. The value of the ratio $\lambda$;
iv, v. The two co-ordinates of the centre of the co-ordinate system used for the measurement and
vi. The phase of the major axis, or a reference axis, of the object or work-piece.

For an instrument having a given ratio for $a/b$, for example a ratio of 2 where the instrument is adapted for measurement of two-lobed epitrochoid shapes, five degrees of freedom are provided for adjustment to accommodate different specific shapes in this family of shapes, that is, twin-lobed epitrochoids.

A further selection of the surface to be measured by the instrument is afforded by provision for reversing the direction of rotation of one of the rotary elements to enable hypotrochoid surfaces to be measured in addition to epitrochoid surfaces.

It is usual in known art of roundness measurement to display the measured profile on a polar chart. In such measurements the speed of rotation of the chart is normally synchronised with the speed of rotation of the work-piece to ensure angular correspondence between the chart and the work-piece. It is appreciated in this invention that the same angular correspondence between work-piece and chart can only be achieved by arranging that the angular velocity of the chart corresponds at all times to the angular velocity of the work-piece relative to the feeler. It can be shown that to a close approximation the variations from a constant angular velocity are proportional to $\sin 2\theta$. The angular velocity of the chart can be made to obey this law by a number of methods, for instance using a generator to frequency modulate the stepper motor drive of the chart. In order to ensure coincidence of the start of chart and work-piece rotation a switch may be incorporated into the rotary elements to trigger a differential analyser circuit.

In the envisaged practical application of the invention to the testing of the surface profile of an epitrochoidal combustion chamber in a Wankel engine stator, the size of the surface transducer feeler or probe may itself be made substantially the same as that of the tool used to grind the combustion chamber surface, so as to take into account departures from the theoretical form due to the finite size of this tool.

What is claimed is:

1. An instrument for testing the profile of a surface of an object having a nominal shape which is non-circular, said instrument comprising:

a surface transducer having a feeler adapted to engage the surface of the object;

mounting means for the object under test, rotatable about a first axis;

support means carrying said mounting means, said support means being rotatable about a second axis spaced from and parallel to the first axis;

means supporting the transducer at a fixed position relative to said second axis, and drive means for effecting rotation of the mounting means about the first axis and rotation of the support means about the second axis to cause the feeler to move over the surface of the object, wherein the resultant path traced by the feeler relative to said surface of the object under the action of said drive means conforms to said nominal shape, the transducer being responsive to departures of said surface from said nominal shape.

2. The instrument defined in claim 1, wherein the transducer feeler has a direction of maximum sensitivity in respect of the detection of surface variations by the transducer, and including compensating means connected to the transducer and effective to modify the output of the transducer to compensate for changes in said output due to changes in the angle between said direction of maximum sensitivity of the transducer feeler and the surface of the object under test at its point of contact with the feeler.

3. The instrument defined in claim 1, including swivel mounting means for the transducer feeler, permitting rocking movement of the feeler about an axis parallel to said first axis, said mounting means including surface contact elements which engage the surface of the object under test on each side of the transducer feeler to maintain the feeler with its direction of maximum sensitivy generally perpendicular to the surface of the object at the point of contact of the feeler with said surface.

4. The instrument defined in claim 1, wherein the nominal shape is trochoidal and further including polar recording means for recording the surface profile of the object in polar coordinates the polar angle of which at any given instant corresponds to the instantaneous polar angle $\theta$ of the rotation about one of the two axes of rotation, and means modifying said polar angle by a correction for the angular displacement between the surface feeler and the line joining the two axes of rotation, said angular correction being a function of the angle $\theta$.

5. The instrument defined in claim 4, wherein the angular correction is proportional to $\sin n\theta$, where $n$ is the number of lobes of the trochoidal nominal shape.

6. The instrument defined in claim 5, wherein the trochoidal nominal shape has two lobes ($n = 2$) and the angular correction is given by:

$$\tan^{-1}\left(\frac{\lambda}{\sqrt{9-\lambda^2}}\right)\sin 2\theta$$

where $\lambda$ is the degree of said trochoidal shape.

7. The instrument defined in claim 4, wherein the means modifying the polar angle are effective to modulate the polar angle display of the recording means with said angular correction.

8. The instrument defined in claim 7, wherein the polar recording means has a chart and means rotating said chart at a rotational speed having a constant component and a sinusoidal modulation component proportional to the angular correction.

9. The instrument defined in claim 7, wherein the modulating means for the polar angle display comprise synchronous detector means responsive to the rotation about one of said axes.

* * * * *

UNITED STATES PATENT OFFICE
CERTIFICATE OF CORRECTION

PATENT NO. : 3,885,318
DATED : May 27, 1975
INVENTOR(S) : DAVID JOHN WHITEHOUSE et al

It is certified that error appears in the above-identified patent and that said Letters Patent are hereby corrected as shown below:

Under item
[30] Foreign Application Priority Data, add the following:

Feb. 21, 1973   United Kingdom........ 8427/73

Signed and Sealed this twenty-third Day of March 1976

[SEAL]

Attest:

RUTH C. MASON
Attesting Officer

C. MARSHALL DANN
Commissioner of Patents and Trademarks